United States Patent [19]

Sakamoto

[11] Patent Number: 4,663,694

[45] Date of Patent: May 5, 1987

[54] CHIP CAPACITOR

[75] Inventor: Yukio Sakamoto, Fukui, Japan

[73] Assignee: Murata Manufacturing Co., Ltd, Kyoto, Japan

[21] Appl. No.: 819,867

[22] Filed: Jan. 13, 1986

[51] Int. Cl.4 .......................... H01G 1/01; H01G 4/20; H01G 4/10

[52] U.S. Cl. ..................................... 361/305; 361/321

[58] Field of Search ............... 361/305, 309, 320, 321, 361/303, 304; 252/514; 29/25, 42

[56] References Cited

U.S. PATENT DOCUMENTS 4,356,529 10/1982 Kopel .............................. 361/321 X
4,451,869 5/1984 Sakabe et al. .................... 361/321 X Primary Examiner—L. T. Hix
Assistant Examiner—Douglas S. Lee
Attorney, Agent, or Firm—Wenderoth, Lind & Ponack

[57] ABSTRACT

A chip capacitor is constructed having an electrode of one polarity as an internal electrode buried in a dielectric and an electrode of the other polarity as an outer surface electrode coated on the outer surface of a dielectric. The internal electrode employs a metal having a high melting point in order to withstand the baking of the dielectric. The outer surface electrodes can each employ a metal of low melting point and high electric conductivity because of their formation after the baking of the dielectric, whereby the chip capacitor experiences extremely less loss caused by electric resistance even when used in a high frequency circuit.

6 Claims, 5 Drawing Figures

CHIP CAPACITOR

The present invention relates to a chip capacitor of a lamination type used in various electronic circuits.

Figure 5:
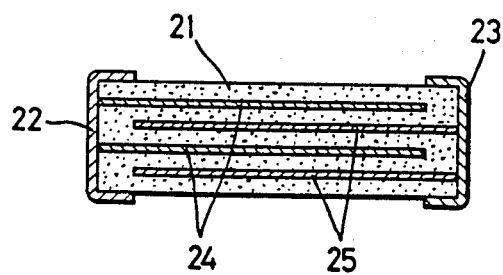

The conventional lamination type chip capacitor is shown in FIG. 5, in which outer surface electrodes 22 and 23 are provided at both lengthwise ends of a dielectric 21 using ceramic or the like and internal electrodes 24 and 25 connected to the outer surface electrodes are buried in the dielectric 21.

The aforesaid lamination type chip capacitor, in which the capacitive internal electrodes 24 and 25 are buried entirely in the dielectric 21, must have the internal electrodes 24 and 25 baked together with the ceramic of the dielectric 21.

Therefore, the internal electrodes 24 and 25 each have to use a heat resistant metal, for example, palladium or platinum, capable of withstanding the ceramic baking temperature.

The heat resistant metal, such as palladium, is expensive and fairly poor in electric conductivity, thereby creating a problem in that when used in the high frequency circuit, the metal causes a large loss caused by the electric resistance.

A first object of the invention is to provide a chip capacitor which can minimize the use of expensive heat resistant metal.

A second object of the invention is to provide a chip capacitor experiencing less loss caused by electric resistance even when used in the high frequency circuit.

A third object of the invention is to provide a chip capacitor which, when used for a resonance circuit, can increase a Q-value and raise the gain of the circuit.

A fourth object of the invention is to provide a chip capacitor which, when used as a bypass capacitor, can obtain a large insertion loss and reduce residual inductance so as to raise the self resonance frequency, thereby enabling the high frequency use limit of the chip capacitor to be widened.

The above and other objects and features of the invention will appear more fully hereinafter from a consideration of the following description taken in connection with the accompanying drawing wherein one example is illustrated by way of example.

Figure 1:
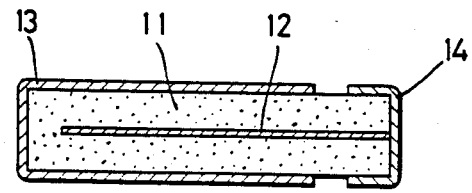
Figure 4:
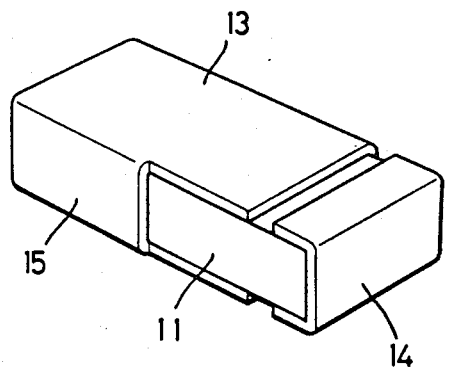
Figure 2:
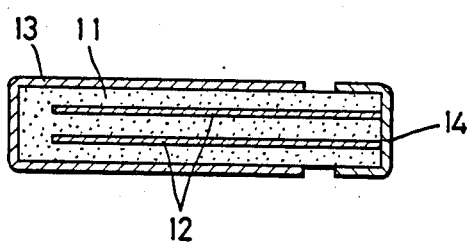
Figure 3:
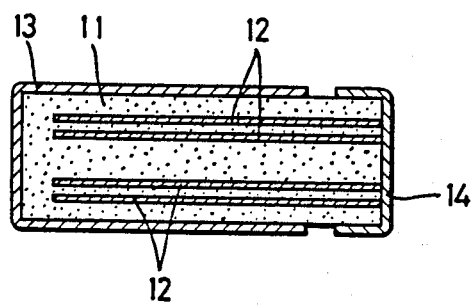

FIG. 1 is a longitudinal sectional side view of a first embodiment of a chip capacitor of the invention, FIG. 2 is a longitudinal sectional side view of a second embodiment thereof, FIG. 3 is a longitudinal sectional side view of a third embodiment of the same, FIG. 4 is a perspective view of a fourth embodiment of the same, and FIG. 5 is a longitudinal sectional side view of the conventional chip capacitor.

Referring to FIGS. 1 through 3, reference numeral 11 designates a dielectric of ceramic, which has buried therein one internal electrode 12 in, FIG. 1.

The internal electrode 12 is buried in the dielectric 11 by the conventional method. In this case, when the ceramic to be the dielectric 11 is baked, the internal electrodes 12, which have been buried in the ceramic, should be of a metal, such as palladium or platinum, having a high melting point. The chip capacitor of the present invention uses one internal electrode 12 of one polarity, thereby reducing the number of internal electrodes needed resulting in a low cost of the material.

The electrode of the other polarity is an outer surface electrode coated on to the outer surface of the dielectric.

Reference numerals 13 and 14 designate outer surface electrodes respectively, outer surface electrode 13 being widely coated on both surfaces of the dielectric 11 to create electrostatic capacity between both surfaces of the outer surface electrode 13 and the internal electrode 12.

The outer surface electrode 14 is small in length and is connected to the internal electrode 12.

The outer surface electrodes 13 and 14 may be coated onto the dielectric 11 after the ceramic has been baked so that a metal, such as silver, copper or aluminum, having a low cost and high electric conductivity is usable as the material for the same.

In the first embodiment in FIG. 1, one internal electrode 12 is of one polarity, but the second embodiment in FIG. 2 provides two electrodes and the third embodiment provides four electrodes, each having the one polarity respectively.

When the number of internal electrodes of one polarity increases and each internal electrode 12 is connected in parallel to the outer surface electrode 14, the internal electrodes 12 as a whole can reduce a resistance value even for a high resistance value of the individual electrode 12.

The fourth embodiment in FIG. 4 has outer surface electrodes 13 provided at the both surfaces of the dielectric 11 and connected to each other through electrodes 15 at the side surfaces, thereby being advantageous in that the residual impedance is reduced.

The above mentioned chip capacitor of the invention is constructed as that an electrode of one polarity is an internal electrode buried in the dielectric and an electrode of other polarity is an outer surface electrode coated on to the outer surface of the dielectric, the outer surface electrodes being formed of material, such as silver or copper or aluminum, of $5 \times 10^{-8} \Omega m$ or less having a low cost and a high electric conductivity, thereby being of extremely small equivalent series resistance in comparison with the conventional chip capacitor which obtains the electrostatic capacity between the internal electrodes.

Accordingly, the chip capacitor of the invention, when used in a resonance circuit, can raise the Q-value and increase the gain of the circuit.

Also, the chip capacitor of the present invention, when used as the bypass capacitor, can obtain a large insertion loss.

Furthermore, the residual inductance is reduced to raise the self resonance frequency of the capacitor, thereby enabling the high frequency use limit of the capacitor to be widened.

Although several embodiments have been described, they are merely exemplary of the invention and not to be constructed as limiting, the invention being defined solely by the appended claims.

I claim:

1. A rectangular chip capacitor comprising:
   a dielectric having first and second opposite major parallel faces and an edge face extending between said major faces;
   an internal capacitive electrode of one polarity buried in said dielectric and extending parallel to and between said two major faces;
   an external capacitive electrode of the other polarity provided on at least said first and second opposite major faces of said dielectric, said internal capacitive electrode extending between said external capacitive electrode provided on at least said first and second major faces for forming an electrostatic capacitance between said internal and external capacitive electrodes; and a conductive electrode provided on a part of said edge face and conductively connected to said internal capacitive electrode.

2. A rectanuglar chip capacitor as claimed in claim 1 wherein, said edge face is comprised of two opposite end faces and two opposite side faces each extending between said opposite end faces, and said conductive electrode is provided on one of said opposite end faces and conductively connected at said one of said opposite end faces to said internal capacitive electrode.

3. A rectangular chip capacitor as claimed in claim 1 wherein, said internal capacitive electrode is comprised of a plurality of internal electrodes buried in said dielectric, each of said plurality of internal electrodes extending parallel with one another and conductively connected to said conductive electrode at said part of said edge face.

4. A rectangular chip capacitor as claimed in claim 2 wherein, said external capacitive electrode provided on said at least first and second opposite major faces is provided on the other of said opposite ends faces, for forming an integral external capacitive electrode.

5. A rectangular chip capacitor as claimed in claim 2 wherein, said external electrode provided on said first and second opposite major faces is provided on said side faces, for forming an integral capacitive electrode.

6. A rectangular chip capacitor as claimed in claim 1 wherein, said external capacitive electrode is formed of a material having an electric conductivity corresponding to at most $5 \times 10^{-4} \Omega m$ while said internal capacitive electrode is formed of a material having an electric conductivity corresponding to less than that of said external capacitive electrode.

* * * * *